United States Patent [19]

Flynn

[11] Patent Number: 4,875,642

[45] Date of Patent: Oct. 24, 1989

[54] LIGHT AIRCRAFT WITH PARACHUTE WING

[75] Inventor: John P. P. Flynn, Hereford, England

[73] Assignee: Powerchute Systems International Inc., Hereford, England

[21] Appl. No.: 155,677

[22] Filed: Feb. 16, 1988

[30] Foreign Application Priority Data

Feb. 13, 1987 [GB] United Kingdom ................ 8703299

[51] Int. Cl.$^4$ ............................................ B64C 39/00
[52] U.S. Cl. ...................................... 244/13; 244/902; 244/903
[58] Field of Search ............... 244/900, 901, 902, 903, 244/904, 13, 54

[56] References Cited

U.S. PATENT DOCUMENTS

| 3,361,388 | 1/1968 | Girard et al. | 244/903 |
|---|---|---|---|
| 4,399,969 | 8/1983 | Gargan | 244/902 |
| 4,548,371 | 10/1985 | Dempsey | 244/54 |
| 4,568,043 | 2/1986 | Schmittle | 244/900 |
| 4,601,443 | 7/1986 | Jones et al. | 244/903 |
| 4,657,207 | 4/1987 | Poling | 244/903 |

FOREIGN PATENT DOCUMENTS

| 3046430 | 7/1982 | Fed. Rep. of Germany | 244/903 |
|---|---|---|---|
| 1270654 | 7/1961 | France | 244/902 |
| 1543358 | 10/1968 | France | 244/903 |
| 2585668 | 2/1987 | France | 244/13 |

OTHER PUBLICATIONS

Parafoil Powered Flight Performance, Technical Report AFFDL-72-73, Air Force Flight Dynamic Laboratory, Air Force Systems Command, Wright-Patterson Air Force Base, Ohio, Jan. 1973.

Primary Examiner—Sherman D. Basinger
Assistant Examiner—Thomas J. Brahan
Attorney, Agent, or Firm—Cushman, Darby and Cushman

[57] ABSTRACT

A light aircraft having a parachute-wing, a single propeller, and means for controlling the direction and speed of the aircraft by simple control lines to the canopy. The carriage is supported by at least two support lines which are secured at attachment points spaced apart laterally with respect to the fore and aft direction of the craft. By ensuring that the support lines are of different lengths a side-to-side suspension bias is created which compensates for the propeller torque reaction. This is a permanent adjustment which allows the aircraft to be balanced so that control of flight may be effected without difficulty. Preferably, the carriage is constructed to use a longitudinal base strut on which a foldable tricycle under carriage is mounted. An upright strut is pivotally mounted to the base strut. The frame of the pilot's seat is used as an integral structural member which rigidly links the base strut to the upright strut in the running condition. The two struts and the sear frame form a triangle.

3 Claims, 6 Drawing Sheets

LIGHT AIRCRAFT WITH PARACHUTE WING

BACKGROUND OF THE INVENTION

The present invention relates to a light aircraft employing a parachute wing. A parachute wing has a fabric parachute canopy which assumes an aerofoil section shape in flight. The shape of the canopy is maintained by air flow, the canopy having no rigid struts, and lift is generated by forward motion of the aerofoil shaped canopy. The pilot sits in a carriage suspended in flight from the parachute-wing and motive power is provided by an engine-driven propeller mounted on the carriage.

Objects of the invention are to provide a light aircraft of the kind described which is inexpensive, easy to fly, and safe. A particular advantage of the parachute-wing aircraft is that the wing may be packed into a particularly compact bag since there are no rigid struts. A feature of the invention is the design of a fold-up carriage which is simple to erect and which may be stowed in a compact form.

Powered parachute-wing aircraft have been suggested hitherto, but no machine has been disclosed which provides satisfactory solutions to certain practical problems. Two closely associated problems are those of control of the wing and the effect of propeller torque reaction. The effect of propeller torque reaction is to tend to twist the engine, and thus the carriage, in a direction opposite to that of the propeller rotation. While this effect is negligible in a rigid-wing aircraft of significant weight, it is significant in a light, parachute-wing aircraft. This torque has the effect of exerting a differential left-right tension on the support lines, and therefore unbalancing the aircraft and affecting control, particularly if control is by means of control lines extending from the canopy to the carriage.

Earlier discussion of powered parachute-wing aircraft have not addressed this problem. For example, U.S. Pat. Nos. 3,343,779 and 4,375,280 have shown schematic arrangement for supporting a propeller-driven load from a parachute wing. The earlier specification has no discussion of directional control and shows suspension of the load from a single suspension point. If there were to be any directional control with such an arrangement, since the disposition of the load with respect to the wing is uncontrollable, this would have to be effected by a rudder on the load.

Such an arrangement is indeed suggested in U.S. Pat. No. 4,375,280 (U.S. Pat. No. '280). Again, in the majority of embodiments the load or carriage is supported at a single point from a free wing which may be rigid or partly flexible. There is discussion in U.S. Pat. No. '280 of a two-point suspension system to allow the altitude of the carriage to be controlled with respect to the wing, but no discussion of the effect of torque reaction.

Compensation for the effect of torque reaction is possible by the use of contra-rotating propellers. A two-propeller machine is disclosed, for example, in U.S Pat. No. 4,424,945. However, here there is also a rigid wing in addition to a parachute wing and the purpose of the second propeller and engine is said to be for additional power. There is no discussion of torque reaction.

Contra-rotating propeller arrangements are heavy and expensive. Also, the provision of flaps and rudders on the carriage is unduly complex, adds to the weight and is expensive.

SUMMARY OF THE INVENTION

In accordance with the above objects, the present invention provides a light aircraft having a parachute-wing, a single propeller, and means for controlling the direction and speed of the aircraft by simple control lines to the canopy. This is made possible in accordance with the invention by arranging that the carriage is supported from the canopy by at least two support lines which have attachment points spaced apart laterally with respect to the fore and aft direction of the machine, and by ensuring that the support lines are of different lengths so as to provide a side-to-side suspension bias which compensates for the propeller torque reaction.

While it is possible to use two attachment or suspension points on the carriage, a preferable arrangement is to use four points arranged in a square aligned with the fore-and-aft and lateral directions.

The biased support-line arrangement described makes it possible to balance the aircraft for normal cruising flight. This simplifies control, which is effected by pulling on the control lines.

It is a particularly important feature of the invention that the aircraft should be easy to fly. To this end, a handle-bar control unit has been devised which has two hand-grips, an engine twist throttle control in one hand-grip and an attachment point at each end for a respective one of the two control lines. The handle-bar unit is free, not being mounted on a column, and this gives easy and intuitive control by pushing the unit away as a whole to give balanced braking on both sides of the canopy, or by turning the handle-bar unit to draw the lines in differentially so as to turn in flight.

For safety, it is preferable to limit the extent to which the control lines may be drawn in, thus obviating the risk of stalling by the inexperienced. To this end, the control lines are drawn through apertures and carry stop blocks which will not pass through.

The structure of the carriage is important in minimizing weight and facilitating handling and stowage. Preferable construction uses a longitudinal base strut on which is mounted a foldable tricycle undercarriage and an upright strut pivoted to the base strut. The frame of the pilot's seat is used as an integral structural member which rigidly links the base strut to the upright strut in the running condition, the two struts and the seat frame forming a triangle. A forward tie cable is preferably used to tie the top of the upright strut to the front of the base strut so as to put the seat frame in compression and add rigidity to the structure.

Preferably, the top of the upright strut carries a fore-and-aft support bar which has at its forward end a support bracket for the parachute-wing support lines and at its rear end a "U"-shaped guide for the parachute lines. Such a guide can be used to support the lines of the parachute-wing clear of the propeller prior to take-off. This is a lighter and more satisfactory arrangement than a complete propeller guard.

Further objects, featured and embodiments of the present invention will become apparent from the description of preferred embodiments which follows, when considered together with the attached figures of drawing.

DETAILED DESCRIPTION OF THE PREFERRED EMBODIMENT

Figure 1:
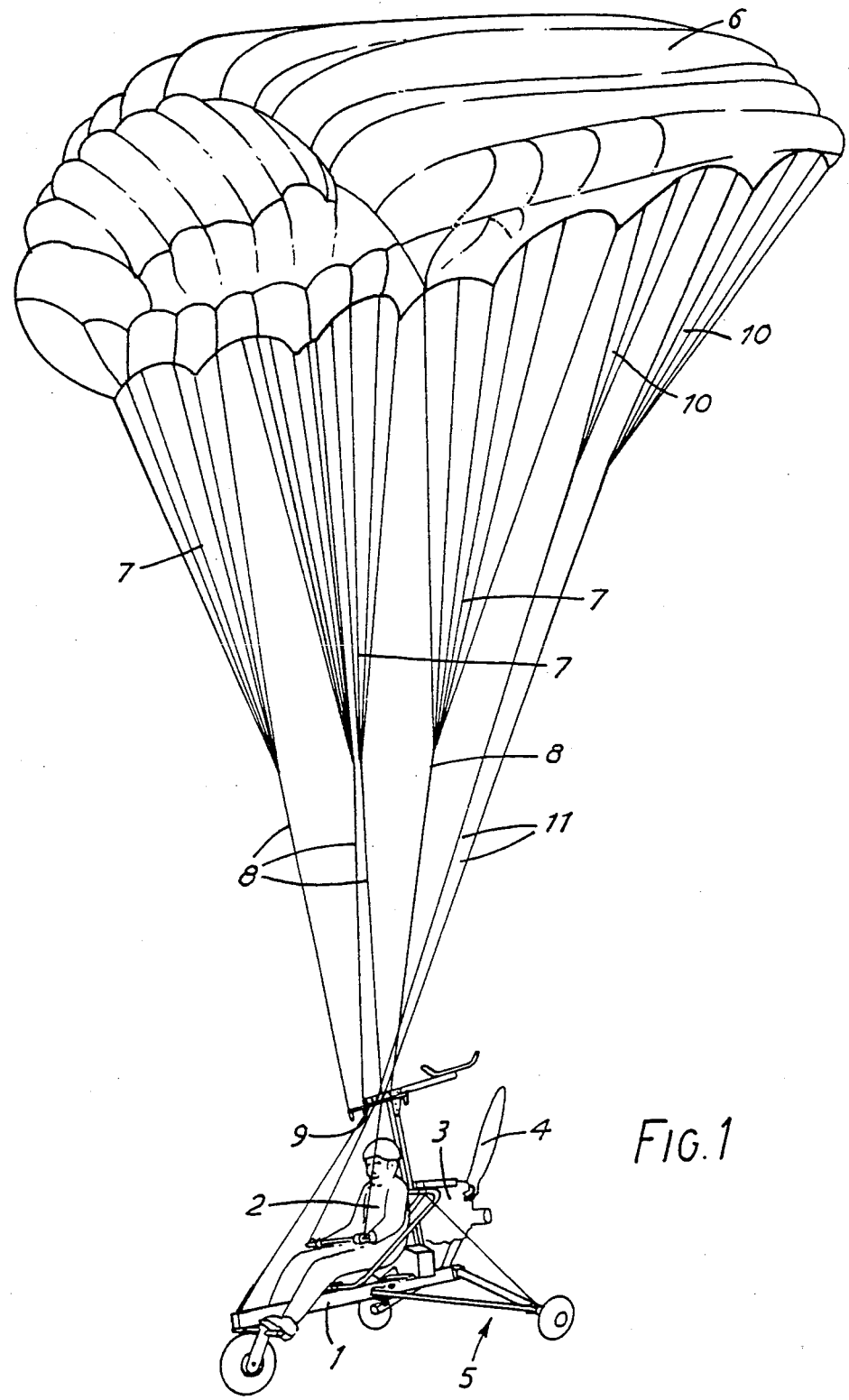
FIG. 1 is a perspective view of a light aircraft in flight in accordance with the present invention.

FIG. 1 shows an aircraft comprising a carriage 1 which has a seat for the pilot 2, an engine 3, a propeller 4 and a tricycle undercarriage 5.

In flight, the carriage is supported by a parachute-wing 6 which is entirely made of parachute fabric. When in flight, the wing is substantially rectangular in plan and has an aerofoil section so that lift is generated by forward motion. The shape of the wing is maintained by the air flow.

Spaced points of the parachute-wing canopy are connected to rigging lines 7. Four sets of these lines are brought together to four support lines 8 which are attached to discrete suspension points 9 on the carriage. Further rigging lines 10 are connected to points along the trailing edge of the parachute-wing. These lines 10 are brought together to respective right-hand and left-hand control lines 11 which pass to the pilot. By drawing on a control line the pilot is able to increase lift of the canopy either at one side or the other, for turning, or at both sides simultaneously for braking.

As shown in FIG. 1, the single propeller 4 rotates in a clockwise direction as seen from the rear of the carriage. This gives a counter-clockwise torque reaction. To compensate for this, the rear support line 12 on the port side is shortened with respect to the others. This is a permanent modification which is set empirically. The length of the lines are not adjustable in flight.

Figure 2:
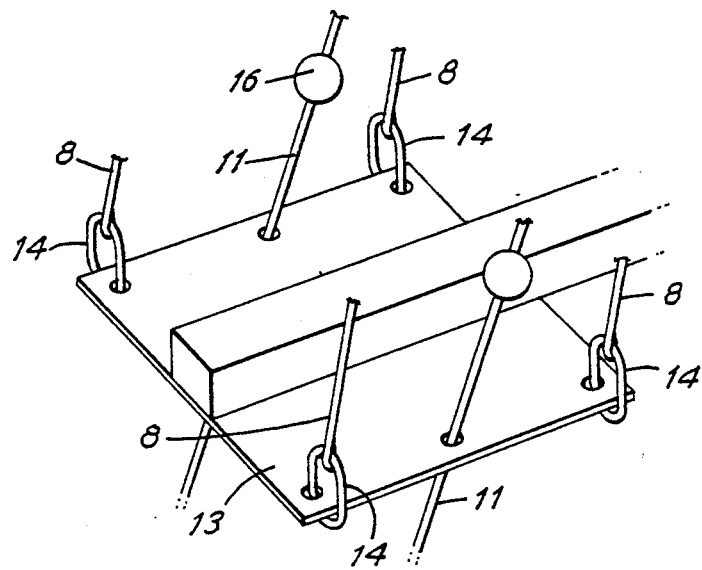
FIG. 2 is a view of the support bracket of the aircraft of FIG. 1.

FIG. 2 shows the support bracket 13 which has suspension rings 14 for the support lines 8. It will be seen that the suspension points are arranged in a square aligned with the fore-and-aft and lateral directions of the carriage. FIG. 2 also shows the control lines 11 passing through guide rings 15 linked to support bracket 13. In order to prevent the control lines 11 from being drawn in too far with the risk of stalling, blocks 16 are attached to the lines to form stops which will not pass through holes 15.

Figure 3:
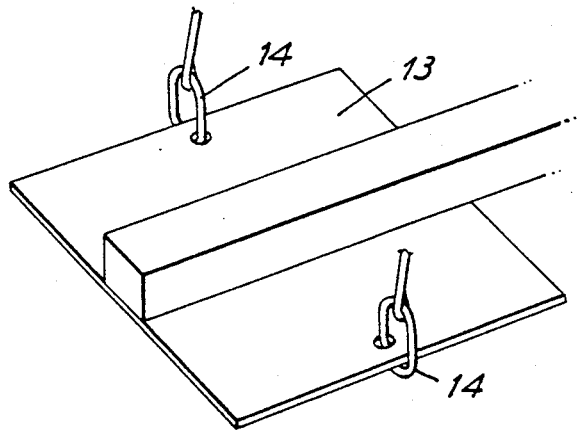
FIG. 3 is a view of an alternative support bracket of the aircraft.

FIG. 3 shows an alternative support bracket where there are only two suspension rings 14 spaced laterally.

Figure 4:
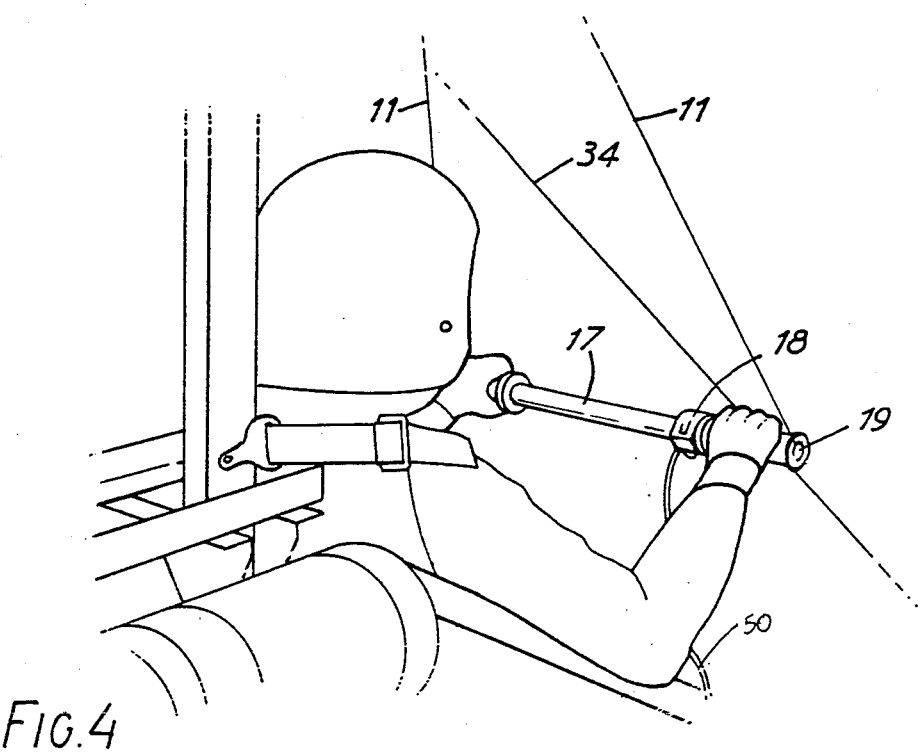
FIG. 4 is a diagram showing the handle-bar control unit of the aircraft.

FIG. 4 shows the control unit 17 used by the pilot. Control Unit 17 comprises a handle-bar with a hand-grip at each end. The right-hand grip has a twist throttle control 18 linked by cable 50 to the engine throttle. Rings 19 at each end of the unit form attachment points for the ends of the respective control lines 11.

Figure 5:
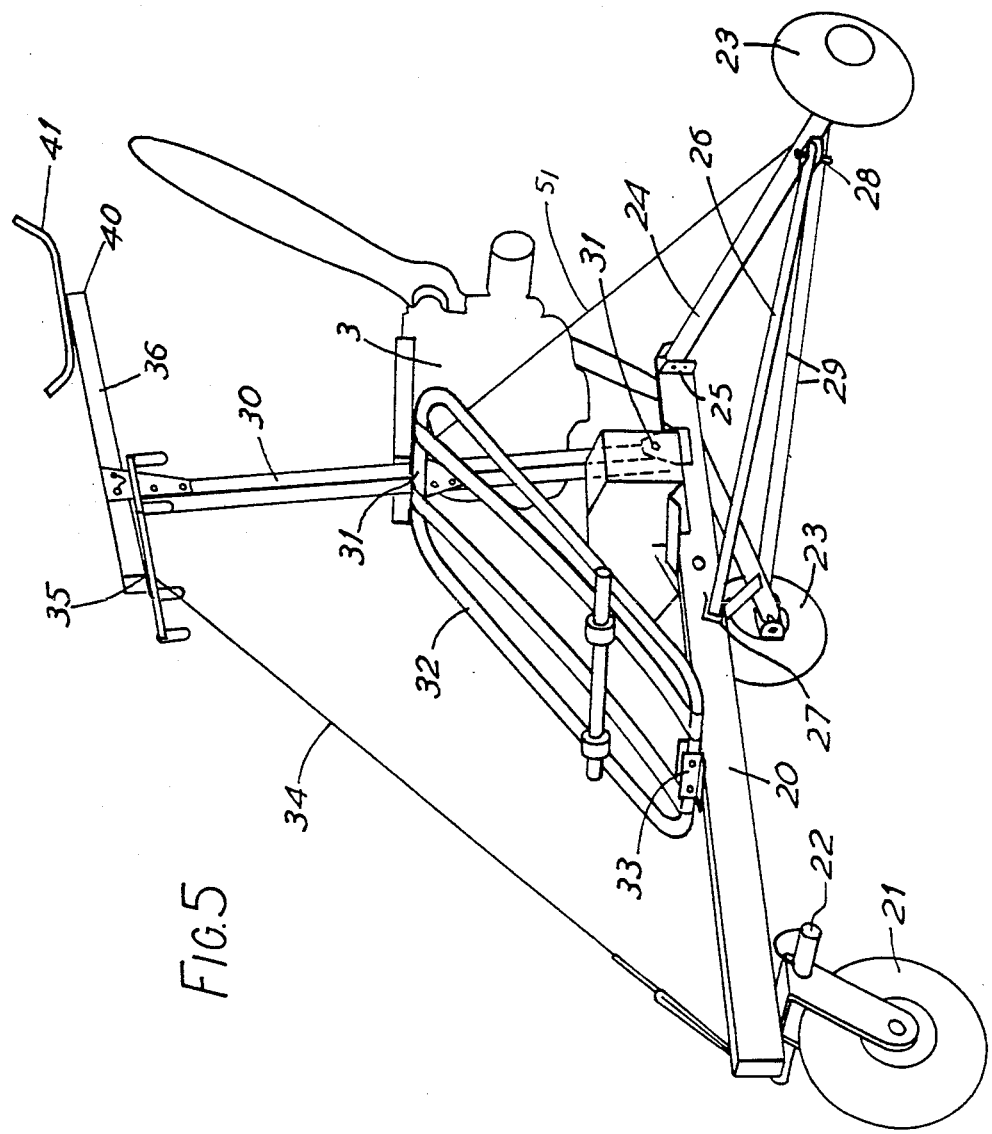
FIG. 5 is a view of the carriage of the aircraft in the running condition.

FIG. 5 is a view of the carriage 1 in the running condition. A fore-and-aft base strut 20 has a front wheel 21 pivotally fixed in castor fashion at the front end. Foot-bars 22 allow the pilot to steer. Rear wheels 23 are attached by rear wheel struts 24 universally jointed to the rear end of the base strut at 25. Tie bars 26 are pivoted to the base strut at 27 and detachably fixed to the wheel struts at 28. A double tie cable 29 couples the ends of the wheel struts 24 so as to form an "A" shape therewith.

An upright strut 30 is pivotally-attached at 31 to base strut 20. Pivoted to the upright strut is a seat frame 32 which, at its other end, base 33, is detachably mounted to the base strut 20. The two struts 20, 30 and the seat frame 32 make a structural triangle. Seat frame 32 is maintained in compression by tension in the front tie cable 34 which couples the front of the base strut 20 to the forward end 35 of a support bar 36 at the top of upright strut 30.

To fold carriage 1, the engine 3 is removed and the top of the front tie cable 34 is detached from the support bar 36. A pin 37 is removed to allow support bar 36 to fold along the upright, by pivoting bar 36 toward strut 30. Pins at 38 are removed to allow the seat frame to be detached at base 33 from the base strut 20.

Figure 6:
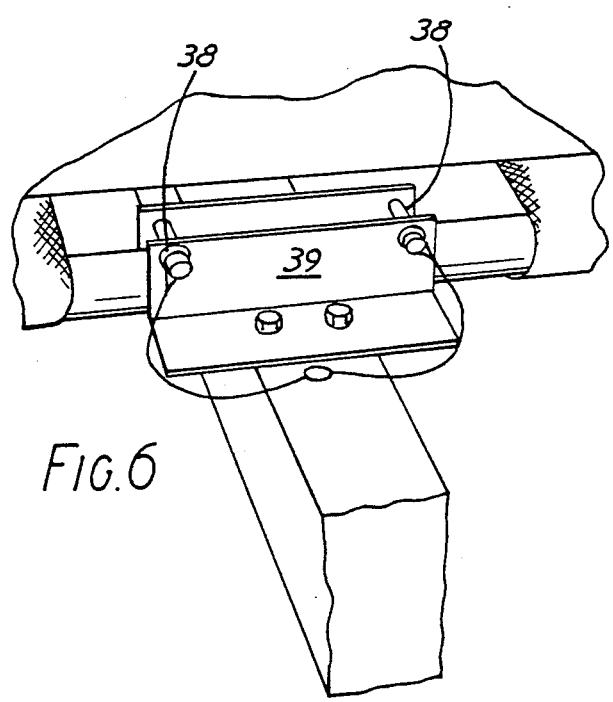
FIG. 6 is a view of the attachment point of the seat frame to the base strut.

FIG. 6 shows pins 38 holding the base 33 of the seat frame 32 in a bracket 39.

Figure 7:
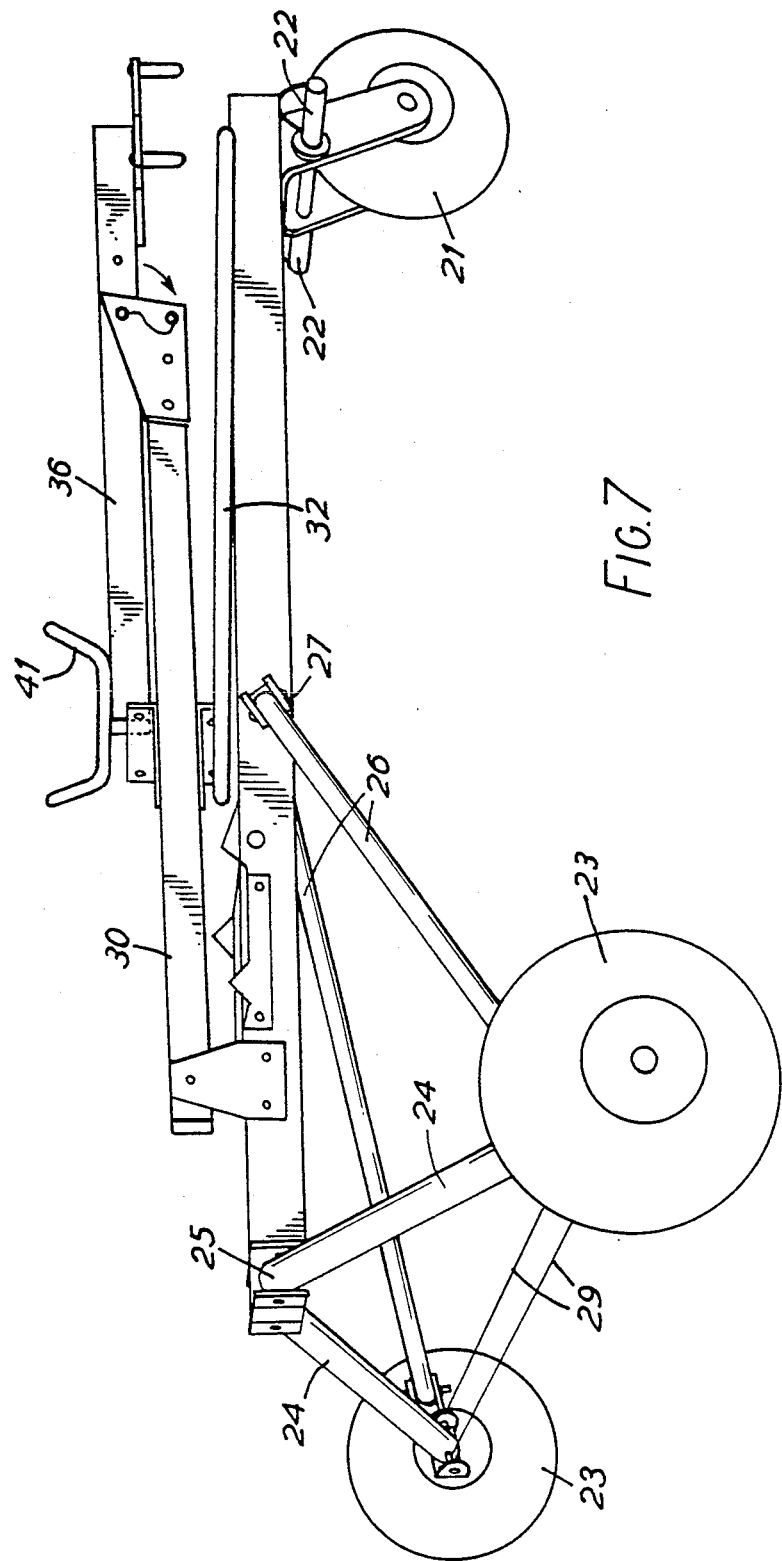
FIG. 7 is a view of the carriage partly folded.

FIG. 7 shows the top part of the carriage folded down. It is to be noted that there are provided two lateral tie cables 51 (FIG. 5) which give lateral support to the upright. The length of these cables and their relation to the hinge at 31 allows folding of the upright strut along the base strut.

Figure 8:
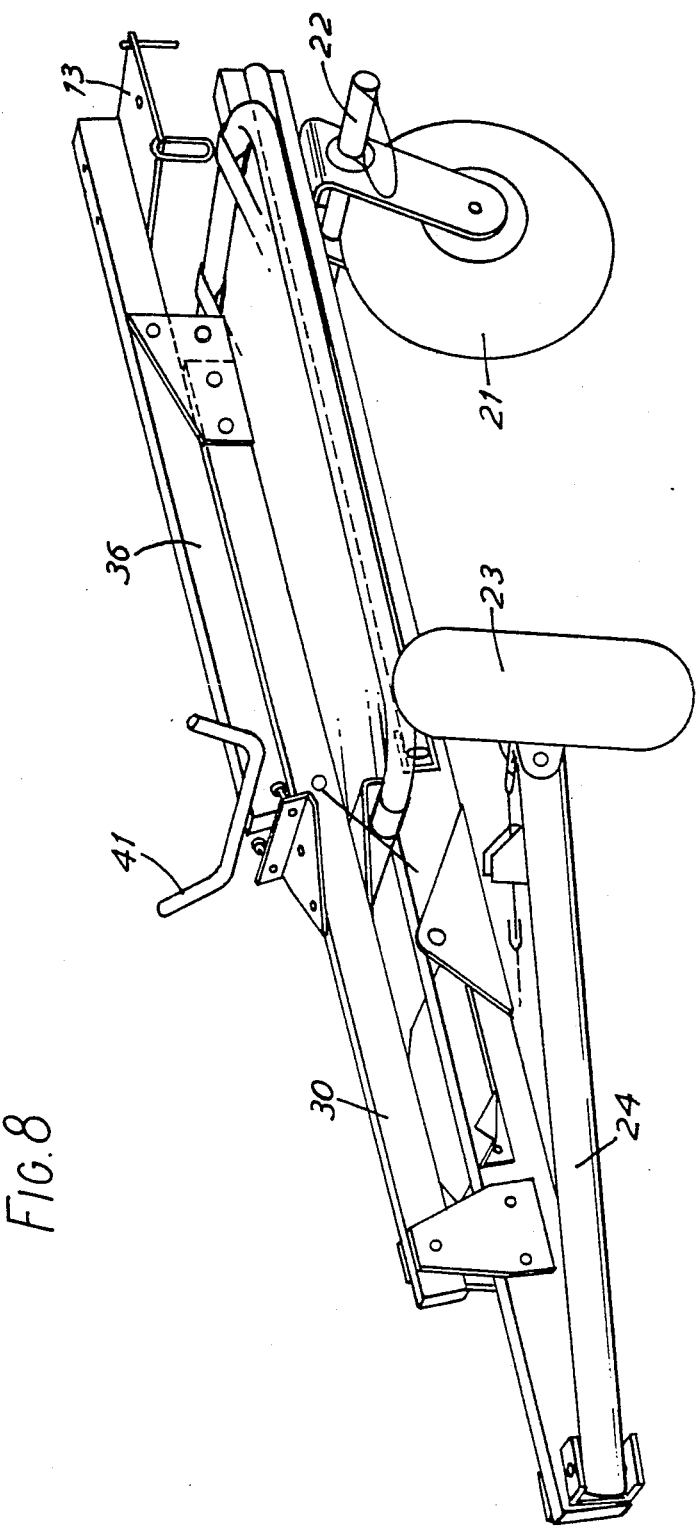
FIG. 8 is a view of the carriage fully folded to the stowing condition.

FIG. 8 shows the carriage in the fully folded position, tie bars 26 having been detached from the wheel struts and folded along the base strut.

A "U"-shaped guide 41 is mounted at the rear end 40 of the support bar 36. Guide 41 has the function of supporting the parachute-wing lines clear of the propeller on start-up. With the parachute-wing set on the ground behind the carriage 1 the lines are laid on guide 41 and the engine started. The back-draught from the propeller inflates the canopy and this is assisted by forward movement. The canopy rises and the lines are maintained clear of the propeller.

The effect of the support line bias on the balance of the aircraft is very sensitive for balance of the propeller torque at cruising speed, a length difference of only a few inches—in a total length of 15 to 20 feet—is found to be effective.

What is claimed is:

1. A light aircraft carriage for use with a parachute-wing attached to the carriage by support lines, the carriage being foldable from a running condition to a stowing condition and comprising:
  (a) a base strut having a fore and an aft;
  (b) a front wheel mounted beneath the base strut substantially near the fore end thereof;
  (c) a pair of rear wheels;
  (d) a wheel strut for each rear wheel extending between the respective wheel and a respective side of the base strut at the aft end remote from the front wheel;
  (e) a tie bar for each rear wheel extending from the wheel end of a respective wheel strut to the base strut at a point intermediate its ends;
  (f) a pivoted joint at one end of each tie bar and a detachable fixture at the other end;
  (g) a universally pivoted joint at the base strut end of each wheel strut;
  (h) one or more tie cables connected between the wheel ends of the wheel struts so as to make an "A" shape therewith in the running condition;
  (i) an upright strut having a top, a base, a fore and an aft, pivotally mounted at its base towards the aft of the base strut so as to be foldable along the base strut in the stowing condition and be upstanding from the base strut in the running condition;

(j) a pair of lateral tie cables connected between the wheel ends of the wheel struts and an intermediate position on the upright strut so as to give lateral stability to the upright strut;

(k) a seat frame extending in the running condition, between intermediate positions on the base strut and the upright strut and being detachably fixed at one of said positions and pivoted at the other;

(l) a forward tie cable connected between the front of the base strut and the top of the upright strut;

(m) a mounting for an engine at the rear of the upright strut; and (n) a support bracket at the top of the upright strut for attaching support lines of the parachute-wing.

2. A light aircraft carriage as claimed in claim 1 wherein a support bar is provided attached at the top of the upright strut, being disposed in the fore-and-aft direction in the running condition and carrying the support bracket at its forward end.

3. A carriage for a light aircraft as claimed in claim 2 wherein the support bar has a "U"-shaped guide for supporting parachute-wing lines mounted across its rear end.

* * * * *